United States Patent
Medeiros et al.

(10) Patent No.: US 7,521,149 B2
(45) Date of Patent: Apr. 21, 2009

(54) HIGH EFFICIENCY SEMI-FUEL CELL INCORPORATING AN ION EXCHANGE MEMBRANE

(76) Inventors: Maria G. Medeiros, 18 Addy Dr., Bristol, RI (US) 02809; Eric G. Dow, 5 Tanglewood Dr., Barrington, RI (US) 02806; Russell R. Bessette, 86R Aucoot Rd., Mattapoisett, MA (US) 02739; Susan G. Yan, 17 Anglewood Ct., Fairport, NY (US) 14450; Dwayne W. Dischert, 25 J H Dwyer Dr., Middletown, RI (US) 02842

( * ) Notice: Subject to any disclaimer, the term of this patent is extended or adjusted under 35 U.S.C. 154(b) by 865 days.

(21) Appl. No.: 10/923,610

(22) Filed: Aug. 11, 2004

(65) Prior Publication Data

US 2006/0172165 A1    Aug. 3, 2006

(51) Int. Cl.
*H01M 4/36* (2006.01)
*H01M 4/48* (2006.01)
*H01M 6/20* (2006.01)

(52) U.S. Cl. .......................................... 429/105; 429/27
(58) Field of Classification Search .................. None
See application file for complete search history.

(56) References Cited

U.S. PATENT DOCUMENTS

| | | | |
|---|---|---|---|
| 4,180,623 A * | 12/1979 | Adams | 429/21 |
| 4,259,417 A * | 3/1981 | Bellows et al. | 429/101 |
| 6,228,527 B1 | 5/2001 | Medeiros et al. | |
| 6,465,124 B1 | 10/2002 | Medeiros et al. | |

* cited by examiner

*Primary Examiner*—Patrick Ryan
*Assistant Examiner*—Julian Mercado

(57) ABSTRACT

A new semi-fuel cell design that incorporates ion exchange membranes to create separate compartments for the anolyte and catholyte to flow through the semi-fuel cell thereby isolating the metal anode of the bipolar electrode from the catholyte while still allowing the necessary ion transfer to affect the necessary electrochemical balance for the reaction to take place in the semi-fuel cell.

13 Claims, 1 Drawing Sheet

HIGH EFFICIENCY SEMI-FUEL CELL INCORPORATING AN ION EXCHANGE MEMBRANE

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER RELATED APPLICATIONS

This patent application is co-pending with a related patent application entitled METHOD TO ACCELERATE WETTING OF AN ION EXCHANGE MEMBRANE IN A SEMI-FUEL CELL (Navy Case No. 84277), by Louis G. Carreiro, Charles J. Patrissi, and Steven P. Tucker, employees of the United States Government, and related patent application entitled A BIPOLAR ELECTRODE FOR USE IN A SEMI-FUEL CELL (Navy Case No. 84257) by Charles J. Patrissi, Maria G. Medeiros, Louis G. Carreiro, Steven P. Tucker, Delmas W. Atwater, employees of the United States Government, Russell R. Bessette and Craig M. Deschenes.

BACKGROUND OF THE INVENTION (1) Field of the Invention

The present invention relates to electrochemical systems and more specifically to a novel semi-fuel cell design based on a seawater electrolyte and liquid catholyte combination that uses an ion exchange membrane to isolate the seawater electrolyte and liquid catholyte combination from the seawater anolyte solution.

(2) Description of the Prior Art

Primary batteries employing aqueous electrolytes have been under investigation for several years leading to the development of semi-fuel cells, a hybrid of fuel cells and batteries that combine the refillable cathode or catholyte oxidizer of fuel cells with the consumable anode fuel of batteries. The metal anode and liquid catholyte are consumed to produce energy. Semi-fuel cells are currently being considered as electrochemical energy sources for unmanned undersea vehicles due to the availability of seawater to act as an electrolyte in combination with the liquid catholyte or alone as the anolyte solution. The semi-fuel cell anode is often made of aluminum, magnesium or lithium due to the high faradaic capacity, low atomic weight and high standard potential of these metals. The catholyte is usually a strong oxidizer such as hydrogen peroxide in solution with the seawater electrolyte.

Seawater semi-fuel cells, also known as solution phase semi-fuel cells because the catholyte is in solution with the seawater, are an ideal electrochemical energy source for undersea vehicles. The use of seawater from the undersea vehicle's surroundings minimizes the volume and weight of reactants that need to be carried in the vehicles. This provides an important weight savings to the vehicle. Seawater semi-fuel cells have a high faradaic capacity, and have a high energy density at low current densities while being relatively inexpensive, environmentally friendly, capable of a long shelf life, and not prone to spontaneous chemical or electrochemical discharge.

In order to meet the high energy density requirements of underwater vehicles semi-fuel cells currently being developed are used in stack or multi-stack configurations. The use of bipolar electrodes having an anode on one side and a catalyzed cathode on the other is beneficial in minimizing cell stack size and weight.

In prior art semi-fuel cells, each cell is hydraulically fed in parallel with a seawater and/or sodium hydroxide (NaOH) aqueous electrolyte. The catholyte is carried separately and injected directly into the seawater and/or seawater/sodium hydroxide mixture upstream of the stack inlet at the required concentration, determined by the system power load. Electrochemical reduction of the catholyte, occurs on the electrocatalyst surface of the cathode current collector, receiving electrons from the anode oxidation reaction.

The electrochemical reactions for an aluminum hydrogen peroxide semi-fuel cell are given below:

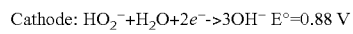
Cathode: $HO_2^- + H_2O + 2e^- \rightarrow 3OH^-$  $E° = 0.88$ V

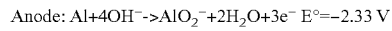
Anode: $Al + 4OH^- \rightarrow AlO_2^- + 2H_2O + 3e^-$  $E° = -2.33$ V

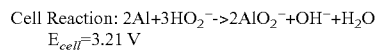
Cell Reaction: $2Al + 3HO_2^- \rightarrow 2AlO_2^- + OH^- + H_2O$
$E_{cell} = 3.21$ V In addition to the primary electrochemical reaction, the following undesired parasitic reactions can also take place:

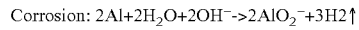
Corrosion: $2Al + 2H_2O + 2OH^- \rightarrow 2AlO_2^- + 3H_2\uparrow$

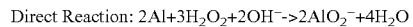
Direct Reaction: $2Al + 3H_2O_2 + 2OH^- \rightarrow 2AlO_2^- + 4H_2O$

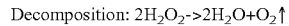
Decomposition: $2H_2O_2 \rightarrow 2H_2O + O_2\uparrow$

The electrochemical reactions for a magnesium hydrogen peroxide semi-fuel cell are given below:

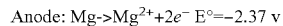
Anode: $Mg \rightarrow Mg^{2+} + 2e^-$  $E° = -2.37$ v

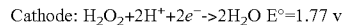
Cathode: $H_2O_2 + 2H^+ + 2e^- \rightarrow 2H_2O$  $E° = 1.77$ v

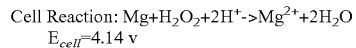
Cell Reaction: $Mg + H_2O_2 + 2H^+ \rightarrow Mg^{2+} + 2H_2O$
$E_{cell} = 4.14$ v In addition to the primary electrochemical reaction, the following undesired parasitic reactions could also take place:

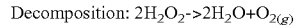
Decomposition: $2H_2O_2 \rightarrow 2H_2O + O_{2(g)}$

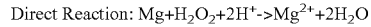
Direct Reaction: $Mg + H_2O_2 + 2H^+ \rightarrow Mg^{2+} + 2H_2O$

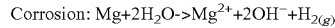
Corrosion: $Mg + 2H_2O \rightarrow Mg^{2+} + 2OH^- + H_{2(g)}$

The electrochemical reactions for the lithium-hydrogen peroxide semi-fuel cell are given below:

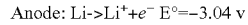
Anode: $Li \rightarrow Li^+ + e^-$  $E° = -3.04$ v

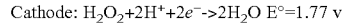
Cathode: $H_2O_2 + 2H^+ + 2e^- \rightarrow 2H_2O$  $E° = 1.77$ v

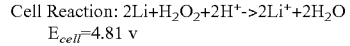
Cell Reaction: $2Li + H_2O_2 + 2H^+ \rightarrow 2Li^+ + 2H_2O$
$E_{cell} = 4.81$ v In addition to the primary electrochemical reactions, the following undesired parasitic reactions could also take place:

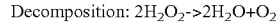
Decomposition: $2H_2O_2 \rightarrow 2H_2O + O_2$

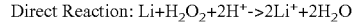
Direct Reaction: $Li + H_2O_2 + 2H^+ \rightarrow 2Li^+ + 2H_2O$

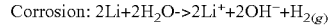
Corrosion: $2Li + 2H_2O \rightarrow 2Li^+ + 2OH^- + H_{2(g)}$

Of the parasitic reactions listed above, the direct reactions are the most detrimental to the operation of the semi-fuel cell since both the metal anode, either magnesium, aluminum or lithium and the the hydrogen peroxide catholoyte are consumed in a single step. A direct reaction occurs when the catholyte, in this case $H_2O_2$, is allowed to come into direct physical contact with the metal anode, resulting in a chemical reaction which does not produce electron transfer and only consumes active energetic materials, thus reducing the overall energy yield of the semi-fuel cell. In most cases this parasitic reaction will consume over 50% of the available energetic materials.

Whereas magnesium, lithium or aluminum corrosion can be suppressed by pH adjustment and hydrogen peroxide decomposition minimized by careful temperature control, in order to minimize or completely prevent the parasitic direct reaction, the metal anode side of the bipolar electrode must be physically isolated from the liquid catholyte.

What is needed is a semi-fuel cell that enables the separation of the metal anode from the catholyte while maintaining necessary ion transfer to affect the necessary electrochemical balance for the reaction to take place. This is accomplished through a new semi-fuel cell design that incorporates an ion exchange membrane to allow a separated flow of anolyte and catholyte in the semi-fuel cell thereby isolating the metal anode of the bipolar electrode from the catholyte.

SUMMARY OF THE INVENTION

It is a general purpose and object of the present invention to eliminate the parasitic direct reaction of the catholyte with the metal anode in a semi-fuel cell, thereby improving the overall energy yield of the semi-fuel cell.

This general purpose and object is accomplished with the present invention by using a semi-permeable membrane capable of ion exchange placed between the anode and cathode compartment of a semi-fuel cell in order to isolate the anolyte and catholyte solutions.

DESCRIPTION OF THE PREFERRED EMBODIMENT

Figure 1:
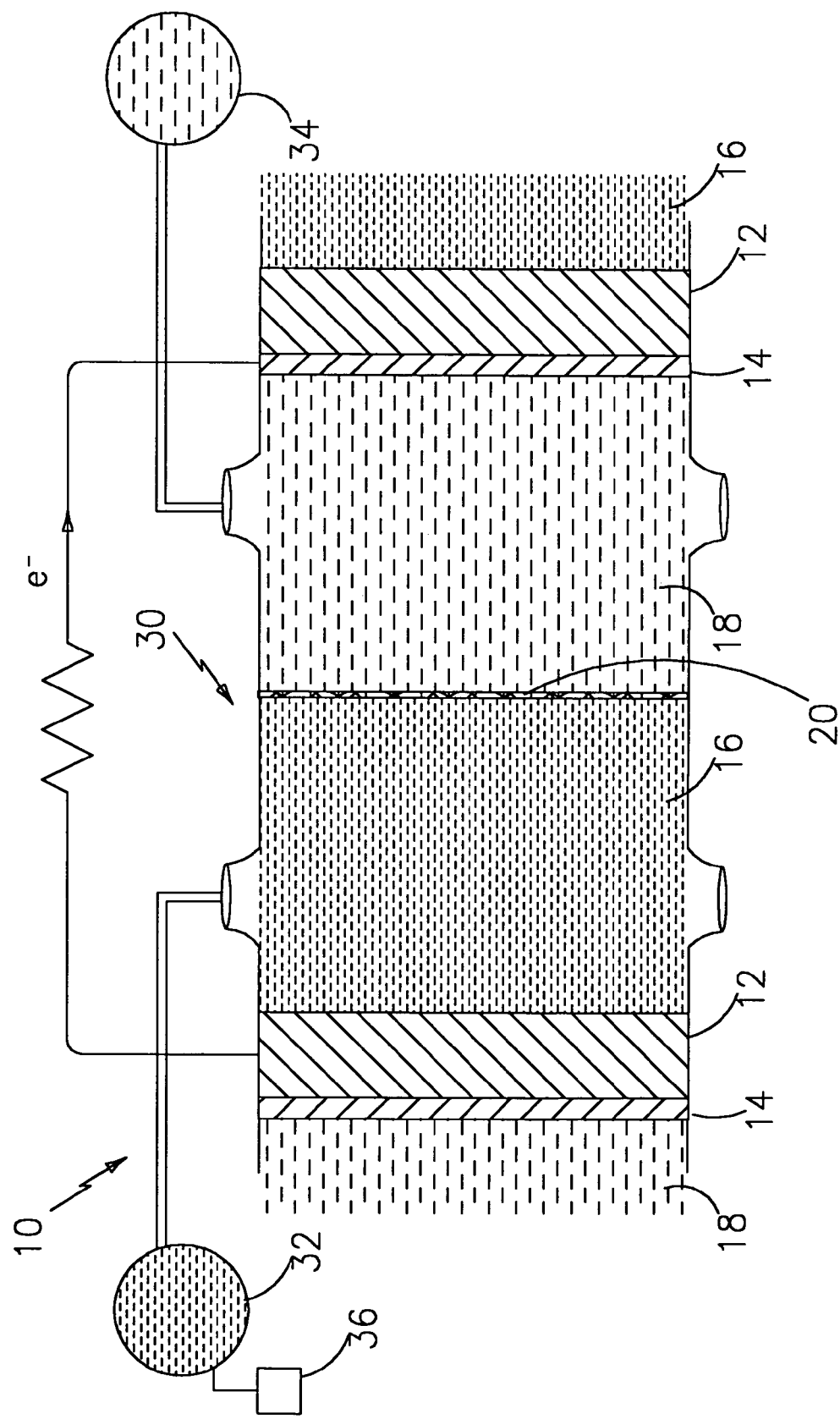
FIG. 1 shows part of a semi-fuel cell stack with a membrane separating the anolyte from the catholyte.

Referring now to FIG. 1 there is shown part of semi-fuel cell stack 10 with a metal anode 12 and a catalyzed cathode 14. In a preferred embodiment, the metal anode is aluminum or magnesium, however, it can also be lithium or other suitable metals or alloys and is not limited as such. Between the anode 12 and cathode 14 is a flow path 30 through which two separate electrolyte fluids the anolyte 16 and catholyte 18 may flow from their respective reservoirs 32 and 34. In a preferred embodiment, the anolyte 16 is seawater or aqueous sodium hydroxide, and the catholyte 18 is hydrogen peroxide in solution with seawater or aqueous sodium hydroxide and/ or acid. Separating the flow path 30 into two separate compartments is an ion exchange membrane 20 that is electrically conductive, capable of exchanging ions and is resistant to both the anolyte 16 and the catholyte 18. When the metal anode 12 is magnesium or lithium, a cation exchange membrane is favored. When the metal anode 12 is aluminum, an anion exchange membrane is favored. In the preferred embodiment, the membrane 20 is a perfluorinated ionomer membrane such as Nafion®, however other ion exchange membranes such as Flemion®, Aciplex XR®, Gore®, PBI (polybenzimidayole), PES (poly-p-phenylene ether sulfone), PEEK (poly-p-phenylether ether ketone) can be used. The membrane 20 can also be a microporous membrane such as Viskase®, Celgard®, FAS® or UCB® Films. The membrane 20 is situated such that the anolyte 16 flows on one side of the membrane 20 making contact only with the metal anode 12. On the other side of the membrane the catholyte 18 flows into the flow path 30 making contact only with the catalyzed cathode 14. In this way the anode 12 is physically separated from the cathloyte 18 by the membrane 20 that separates the two electrolytes but allows ions to pass through it maintaining the necessary ion transfer to affect the proper electrochemical balance for the reaction to take place.

The advantages of the present invention over the prior art are that the electrochemical efficiency of a semi-fuel cell is improved by nearly 80% by virtue of reducing and even eliminating the parasitic direct reaction. Furthermore with the separate flow of the anolyte 16 and catholyte 18, corrosion of the metal anode 12 can now be suppressed by separately adjusting the pH of the anolyte 16 and catholyte 18 in their individual respective reservoirs 32 and 34. In addition the decomposition parasitic reaction is also reduced because the catholyte 18 is not heated. Under normal operating conditions the anolyte 16 may be heated to facilitate the electrochemical reaction. This is especially true when the metal anode 12 is aluminum. In prior art semi-fuel cells electrolytes contained both the anolyte 16 and catholyte 18 in the same solution. However, heating the hydrogen peroxide catholyte 18 accelerates the decomposition parasitic reaction generating oxygen gas, which is an undesirable byproduct, particularly in underwater vehicles. By separating the flow of the anolyte 16 and catholyte 18 through the use of the ion exchange membrane 20, the anolyte 16 can be heated in its own reservoir 32 by a heater 36 without heating the catholyte 18.

Other advantages of the present invention include a reduction in the amount of reactants that need to be carried in the undersea vehicle employing the semi-fuel cell. The high efficiencies minimize the necessary reactants thus lowering the overall weight and volume of the undersea vehicle. The high efficiencies also lower the gas generation due to corrosion, decomposition or other inefficiencies. Lower corrosion rates of the anode also translate to prolonged anode lifetime.

Obviously many modifications and variations of the present invention may become apparent in light of the above teachings. For example, the metal anode may be made of a variety of metals or alloys. Instead of an ion exchange membrane a micro-porous membrane could be used.

In light of the above, it is therefore understood that within the scope of the appended claims, the invention may be practiced otherwise than as specifically described.

What is claimed is:

1. A semi-fuel cell stack that comprises:
   at least two bipolar electrodes each of said bipolar electrode having both an anode and a cathode;
   a flow path between the anode of one of the at least two bipolar electrodes and the cathode of the other of the at least two bipolar electrodes;
   a membrane situated in said flow path dividing said flow path;
   an anolyte contained in a reservoir that flows through said flow path between the anode of one of the at least two bipolar electrodes and the membrane;
   a catholyte contained in a reservoir that flows through said flow path between the cathode of one of the at least two bipolar electrodes and the membrane;
   at least one first reservoir containing the anolyte;
   at least one second reservoir containing the catholyte;
   at least one means for heating the at least one first reservoir containing the anolyte; and
   at least one means for heating the at least one second reservoir containing the catholyte.

2. The semi-fuel cell stack of claim 1 wherein the anodes of the at least two bipolar electrode are metal.

3. The semi-fuel cell stack of claim 2 wherein the metal anodes are made of a metal selected from the group including magnesium, lithium and aluminum.

4. The semi-fuel cell stack of claim 2 wherein the metal anodes are made of an alloy of at least one metal selected from the group including magnesium, lithium and aluminum.

5. The semi-fuel cell stack of claim 1 wherein the membrane is an ion exchange membrane that is conductive and resistant to both the anolyte and the catholyte.

6. The semi-fuel cell stack of claim 5 wherein the ion exchange membrane is selected from the group consisting of sulfonated tetrafluorethylene copolymers having the trade names Nafion®, Flemion®, Aciplex, Polybenzimidazoles, Polyethersulfones, Polyetheretherketones.

7. The semi-fuel cell stack of claim 1 wherein the membrane is a microporous membrane, made of polypropylene and/or polyethylene electrolytic membranes having the trade name Celgard®.

8. The semi-fuel cell stack of claim 1 wherein the anolyte is seawater.

9. The semi-fuel cell stack of claim 1 wherein the catholyte is hydrogen peroxide in solution with seawater.

10. The semi-fuel cell stack of claim 1 wherein the anolyte is an aqueous soluble metal ion hydroxide solution.

11. The semi-fuel cell stack of claim 1 wherein the catholyte is hydrogen peroxide in solution with aqueous soluble metal ion hydroxide.

12. The semi-fuel cell stack of claim 1 wherein the anolyte is an aqueous soluble metal ion chloride solution.

13. The semi-fuel cell stack of claim 1 wherein the catholyte is hydrogen peroxide in solution with the soluble metal ion chloride.

\* \* \* \* \*